United States Patent [19]

Attridge, Jr. et al.

[11] E Re. 30,485

[45] Reissued Jan. 20, 1981

[54] AIR CONDITIONING CONTROL SYSTEM

[75] Inventors: Russell G. Attridge, Jr.; Andrew Kulick, both of Columbus, Ohio

[73] Assignee: Ranco Incorporated, Columbus, Ohio

[21] Appl. No.: 923,085

[22] Filed: Jul. 10, 1978

Related U.S. Patent Documents

Reissue of:

[64] Patent No.: 3,970,246
Issued: Jul. 20, 1976
Appl. No.: 605,908
Filed: Aug. 19, 1975

U.S. Applications:

[62] Division of Ser. No. 438,755, Feb. 1, 1974, Pat. No. 3,915,376.

[51] Int. Cl.[2] ..... G05D 22/00

[52] U.S. Cl. ..... 236/44 C; 200/61.06; 236/99.6; 337/300

[58] Field of Search ..... 236/44 C, 99 A, DIG. 13, 236/91 C; 337/300, 12, 13; 200/61.06; 62/176 E; 73/336

[56] References Cited

U.S. PATENT DOCUMENTS

| | | | |
|---|---|---|---|
| 2,322,339 | 6/1943 | Beals | 62/176 E |
| 3,454,732 | 7/1969 | Liebermann | 200/61.06 |
| 3,949,607 | 4/1976 | Nodulf | 200/61.06 |

*Primary Examiner*—William E. Wayner
*Attorney, Agent, or Firm*—Watts, Hoffmann, Fisher & Heinke Co.

[57] ABSTRACT

A multiple zone forced air type air conditioning system is disclosed in which the amount of atmospheric air admitted to the system is governed according to sensed temperature conditions of air being circulated through the warmest zone. An atmospheric air sensing control unit responds to atmospheric air temperature and moisture levels to minimize introduction of atmospheric air to the system, notwithstanding the temperature of air being circulated through the warmest zone, when atmospheric air temperature is within a predetermined temperature range but contains more than a predetermined amount of moisture, and when atmospheric air temperatures are higher than the temperature range. The control unit enables atmospheric air to be introduced into the system according to the air temperature being circulated through the warmest zone when the atmospheric air is within the temperature range and contains less than the predetermined moisture content as well as when the air temperature is below the temperature range regardless of moisture content.

15 Claims, 3 Drawing Figures

AIR CONDITIONING CONTROL SYSTEM

Matter enclosed in heavy brackets [ ] appears in the original patent but forms no part of this reissue specification; matter printed in italics indicates the additions made by reissue.

RELATED APPLICATION

This application is a *Reissue of U.S. Pat. No. 3,970,246 which is a* division of U.S. Pat. application Ser. No. 438,755 filed Feb. 1, 1974 now U.S. Pat. No. 3,915,376 issued Oct. 28, 1975.

BACKGROUND OF THE INVENTION

1. Field of the Invention

The present invention relates to air conditioning systems and more particularly relates to forced air type air conditioning systems wherein atmospheric air is introduced into the system in controlled amounts to enable the heating or cooling load on the system to be satisfied at least in part by the atmospheric air.

2. The Prior Art

The prior art has proposed air conditioning systems in which the introduction of atmospheric air into a conditioned space or building has been controlled in accordance with sensed temperature and humidity conditions of the atmospheric air. One such proposal is disclosed in U.S. Pat. No. 2,243,647.

These proposals generally governed the introduction of atmospheric air to a system in terms of the sensed atmospheric air temperatures and relative humidity levels independently of the conditions in the zone or space which was being air conditioned.

Over the years the operating requirements for air conditioning systems have changed drastically, particularly in air conditioning systems for large apartment and office buildings. This has been due to the proliferation of electric and gas operated appliances, equipment and lighting; increased numbers of people in such structures; and, the use of construction materials which have affected heating or cooling characteristics, such as buildings having extremely large glass window areas.

It is not unusual to find office buildings in which heat generated by persons, lighting, and equipment within the building, along with heat gains from sunlight entering the building through large window areas, to be sufficiently great that the air circulating in the building need not be heated until atmospheric air temperatures are well below freezing. In such buildings it may even be necessary to provide mechanically chilled air to certain zones in order to prevent those zones from becoming uncomfortably warm even when atmospheric air temperatures are quite low.

In essence, particularly in large buildings, the wide range of air conditioning requirements from zone to zone within the building, and the sometimes great numbers of individual zones being conditioned rendered the atmospheric air temperature and humidity conditions more or less irrelevant to satisfactory operation of the air conditioning systems.

This is not to say that atmospheric air conditions were disregarded entirely, but they were frequently taken into account as secondary control parameters. An example of such a control system is disclosed in U.S. Pat. No. 3,788,386 issued to Merlin E. Demaray, in which the admission of atmospheric air to a multiple zone system was variably controlled according to sensed conditions within the air conditioned building itself. This type of air conditioning control system has been extremely successful in controlling multiple zone systems and provided for substantial usage of atmospheric air to satisfy zone load conditions.

In some circumstances however, the prior art air conditioning systems chilled the circulating air by mechanical refrigeration units, and minimized the introduction of atmospheric air into the system even though atmospheric air temperatures were relatively low, in order to adequately cool and/or dehumidify air in certain zones in which substantial amounts of heat were generated. While the efficiency of mechanical refrigeration units is relatively high when atmospheric temperatures are low, the operation of such units still requires the expenditure of energy, and to the extent this operation of the refrigeration units is avoidable the energy used in operating the units is wasted.

Generally speaking, atmospheric air can be used to heat or cool zones where the atmospheric air temperatures are, respectively, greater or less than the set point temperature of the zones. However, when the moisture content of the atmospheric air is high, or when the zones contain people and/or equipment which produce moisture in the zone air, the atmospheric air may be too moist to be suitable for heating or cooling the zone even though the temperature of the atmospheric air is at a desirable level for that purpose.

Prior art systems have been provided in which the admission of atmospheric air was governed according to sensed temperature and relative humidity of the atmospheric air but these systems have generally not been completely satisfactory because they permitted the admission of atmospheric air having moisture levels which were excessively high and also prevented the admission of atmospheric air at temperature and moisture levels suitable for conditioning the space. Such systems thus permitted admission of air which could not adequately handle the load on the space in some circumstances while in other circumstances they were inefficient because refrigerating equipment or heating equipment was operated unnecessarily.

The prior art has proposed numerous devices for sensing the relative humidity of air and controlling the operation of equipment in response to the sensed humidity. Generally these devices have controlled air humidifying or dehumidifying equipment. Examples of relative humidity sensing devices of the character referred to can be found in U.S. Pat. No. 3,163,729; 3,288,961; 3,270,153; 3,143,610; 3,115,557 and, 3,454,732.

The last mentioned patent provides for controlling humidification of air in a zone in relation to atmospheric air temperatures and the operation of the relative humidity sensing components of the device is altered according to the sensed atmospheric air temperatures. The devices disclosed by the prior art were generally responsive to sensed relative humidity and were not employed as a co-ordinated part of air conditioning control systems.

SUMMARY OF THE INVENTION

The present invention provides a new and improved method and system for controlling operation of an air conditioning system wherein the admission of atmospheric air to the system is controlled as a function of sensed heating or cooling requirements of the space being conditioned as well as according to sensed atmospheric air conditions so that the use of atmospheric air to control load conditions in the space is maximized while air conditioning equipment for controlling air in the system is not unnecessarily operated.

The introduction of atmospheric air to a system is nearly always for the purpose of cooling a space because, as has been noted, most spaces contain heat sources of various descriptions. Hence it is rare to encounter a situation where a space to be air conditioned absorbs heat in such a way as to require the addition of heat from atmospheric air. The invention is therefore discussed generally in reference to the usual situation in which atmospheric air is employed primarily for cooling purposes.

It has been found that governing the introduction of atmospheric air to an air conditioning system primarily according to sensed relative humidity of the atmospheric air results in the exclusion of atmospheric air which is in fact readily usable to cool a space to be air conditioned or, alternatively, permits introduction of air to the system which is at temperature and moisture levels which add heat to the conditioned space causing discomfort and additional cooling requirements.

By governing the admission of atmospheric air within a predetermined temperature range in accordance with detected moisture levels, as distinguished from relative humidity, atmospheric air at substantially all usable temperature and moisture conditions may be introduced into the system as required, while atmospheric air at substantially all unusable conditions is excluded except for minimum amounts of the air as may be required to meet ventilation requirements.

In a system constructed according to a preferred embodiment of the invention an air conditioning system for a building or space includes a duct network through which air is circulated past separate air heating and cooling units, mixed, directed into the space and returned from the space. The duct network includes a ventilation air system including a controllable dampering arrangement by which atmospheric air is introduced into the system at controlled flow rates and like flow rates of air are exhausted from the system.

A control system governs the space temperature by controlling operation of the heating and cooling units, the proportioning of the air passing the heating and cooling units and by controlling the flow rate of atmospheric air introduced into the system to replace air exhausted from the system.

A control system embodying the invention is constructed and arranged so that an analog control signal is produced in accordance with sensed temperature conditions in the air conditioning system. The signal governs the admission of atmospheric air into the system by controlling the operation of an atmospheric air intake damper. When the control signal is at a level indicating that the sensed system temperature conditions are such as to require heating of the air in the system, the flow rate of atmospheric air into the system is minimized. As the control signal level shifts, indicating that heating is no longer required, the flow rate of atmospheric air into the system is increased accordingly, enabling the atmospheric air to satisfy the load.

An important feature of the invention resides in the capability of the control system to override the control signal and prevent introduction of atmospheric air into the system when atmospheric air temperature and/or moisture levels are such that the atmospheric air is not usable to satisfy the load on the system. When the atmospheric air temperature is greater than a predetermined temperature its introduction into the system is minimized regardless of the control signal level since the atmospheric air is simply too warm to reduce temperatures in the system.

When the atmospheric air is within a temperature range below the predetermined temperature level its introduction into the system is governed according to the level of the control signal except when the moisture content of the atmospheric air rises above a predetermined moisture level. When the moisture level is too high the control signal is overridden and the introduction of atmospheric air into the system is minimized since the atmospheric air is too moist to effectively heat or cool the space.

When atmospheric air temperatures are below the temperature range the control signal governs the flow rate of the atmospheric air into the system regardless of its moisture content since the relatively cold air is used to cool the space and the moisture content is not sufficiently great to adversely affect its ability to cool the space.

Another important feature of the invention resides in an atmospheric air sensing control unit which functions to override the control signal. The unit preferably includes a control device, such as a switch, having one condition for enabling the control signal to govern the atmospheric air intake damper and a second condition in which the control signal is prevented from affecting the intake damper and the flow of atmospheric air into the system is minimized.

The control device is operated by a temperature responsive mechanism and a coacting humidity responsive mechanism which maintain the control device in one or the other of its conditions in response to sensed atmospheric air temperature and moisture levels. The temperature responsive mechanism operates to maintain the control device in its second condition when the atmospheric air temperature is above the temperature range regardless of the air moisture content, and maintains the control device in its first condition when the atmospheric air temperature is below the temperature range regardless of the air moisture content.

Within the temperature range the condition of the device is governed by coaction of the temperature and humidity sensing mechanisms.

The humidity responsive mechanism preferably includes an elongated humidity sensing element which changes length in response to changes in relative humidity of the atmospheric air ambient the element. As the relative humidity increases the element elongates and tends to cause the control device to be operated towards its second condition to interrupt the control signal, or to be maintained in the second condition, as the case may be. When relative humidity is reduced the length of the element is reduced which tends to cause the control device to be urged toward, or maintained at, its first condition.

The temperature responsive mechanism changes the effective length of the sensing element in response to sensed ambient air temperature changes within the range so that the device is operated between its conditions in response to changes in air moisture level rather than in response to changes in relative humidity.

The coaction of the temperature and humidity responsive mechanisms assures that atmospheric air having substantially all temperature and moisture conditions which are efficiently usable in a space is introduced to the space as required by system conditions, and that air having unusable temperature and/or moisture conditions is not introduced even though system conditions are such that the air would otherwise be introduced.

Other features and advantages of the invention will become apparent from the following description of a preferred embodiment made in reference to the accompanying drawings.

DESCRIPTION OF A PREFERRED EMBODIMENT

Figure 1:
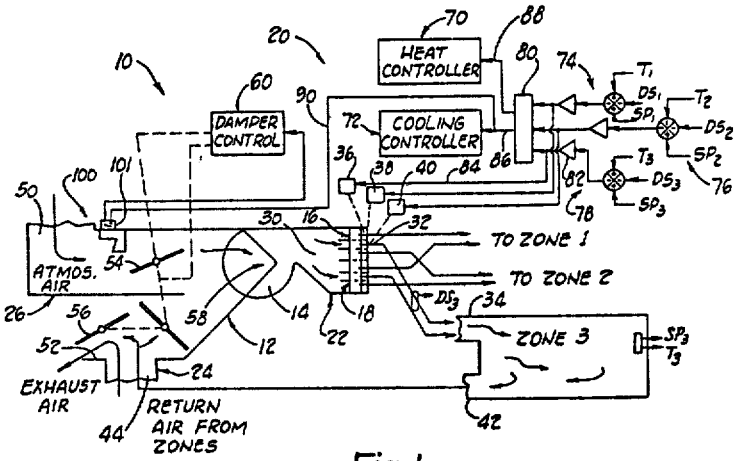
FIG. 1 is a schematic diagram of an air conditioning system constructed according to the invention.

An air conditioning system 10 constructed according to a preferred embodiment of the invention is schematically illustrated in FIG. 1. The system 10 provides conditioned air to three separate zones of a multiple zone building, which itself is not illustrated. The zones are referred to as zone 1, zone 2 and zone 3, and only zone 3 is illustrated schematically. The system 10 includes an air circulating duct network 12, a blower 14 for providing a forced flow of air through the duct network, an air heating unit 16 and an air cooling unit 18, both of which are disposed within the duct network so that air flowing through the network passes across either the cooling unit or the heating unit, and a control system generally indicated by the reference character 20 which governs operation of the system 10.

The system 10 is, for the most part, schematically illustrated and described for the sake of brevity. Many of the briefly described components of the system 10 are shown and described in greater detail in the above referenced U.S. Pat. application Ser. No. 203,329 filed Nov. 30, 1971, now U.S. Pat. No. 3,788,386, to which reference should be made for additional details. Departures in the system disclosed here from that of the referenced application will be apparent from the following description.

The heating unit can be of any suitable or conventional construction but for the purpose of this description the heating unit is considered to be constructed from a plurality of electrical resistance heaters which are operated in stages to govern the amount of heat produced by the heating unit.

The air in the system is preferably mechanically chilled by a plurality of compressor-condenser-evaporator refrigeration units, not shown, which are operable in stages to govern the amount of heat absorbed from the air in the system. The cooling unit 18 includes the evaporators of the refrigeration units.

The air duct network 12 comprises an air delivery duct system 22 for directing air from the blower 14 to the respective zones through the heating and cooling units 16, 18, respectively, a return air duct system 24, only partly shown, for receiving air exhausted from the zones, and a ventilation system 26 by which atmospheric air is admitted to the system 10 while a corresponding amount of air from the return air duct system 24 is exhausted from the system. The system 10 is of a type known as a constant volume system in that a constant flow rate of air continuously circulates in the system and each zone is continuously provided with an unvarying flow rate of air.

The delivery duct system 22 comprises a blower plenum section 30 in which the heating and cooling units 16, 18, are disposed so that air moving through the plenum 30 towards the zones passes across either the heating unit or the cooling unit, a zone damper section 32 at the discharge side of the heating and cooling units, and three discharge ducts 34 (only one of which is partially shown) for directing air from the damper section 32 to each associated respective zone.

The damper section 32 includes three actuable damper pairs (not shown), one pair for each zone. The damper pairs are actuated by respective zone damper control units 36, 38, 40 in accordance with temperature requirements of associated zones. The damper pairs for each zone enable complementary dampering of air flowing to that zone from the heating unit 16 and the cooling unit 18. The damper pair for each zone has one limit position in which all of the air flowing to the zone passes across the heating unit, a second limit position in which all of the air flowing to the zone passes across the cooling unit, and intermediate positions in which the flow of air to the zone consists of a mixture of air which has passed across the heating unit and the cooling unit, with the proportions of the mixture being determined by the position of the damper pair.

The return duct system 24 comprises zone exhaust branches 42 (only one of which is illustrated in connection with zone 3) communicating each zone to a main return duct 44 which directs the combined zone exhaust air flows to the ventilating system 26.

The ventilating system 26 comprises an atmospheric air intake duct 50 through which atmospheric air is introduced into the system 10, an exhaust duct 52 through which air from the return duct 44 is exhausted to atmosphere from the system, and a dampering arrangement for controlling the flow of air through the intake and exhaust ducts 50, 52.

The dampering arrangement comprises an intake air damper 54, an exhaust air damper 56 and a recirculating air damper 58. The dampers 54, 56, 58 are linked together and actuable to desired positions by a damper control unit 60 in response to operation of the control system 20.

The control system 20 governs operation of the heating and cooling units 16, 18, the zone damper control units 36, 38 and 40, and the damper control unit 60 in response to sensed conditions of air circulating in the system 10 as well as sensed atmospheric air conditions. The control system is preferably an electrical system and includes an air heating unit controller 70 for governing the heat transfer to system air from the unit 16, an air cooling unit controller 72 for governing heat transfer from the system air to the unit 18, individual zone signal producing circuits 74, 76, 78 for producing temperature related command signals for governing operation of the controllers 70, 72, and a logic unit 80 interposed between the signal producing circuits and the controllers.

In the preferred and illustrated embodiment, the command signals are low amperage D.C. analog signals, and the heating and cooling controllers are constructed to operate the respective heating and cooling units in stages in response to appropriate changes in applied command signal voltages. The circuitry of the preferred control system is such that as the zone air temperature rises, the magnitude of the command signal voltage increases positively with respect to a reference voltage level in proportion to the temperature rise. As the zone temperature is reduced, the command signal voltage level is likewise reduced.

The zone command signal producing units are all identical and only the unit 78 associated with zone 3 is described. The unit 78 comprises an amplifier 82 for producing the zone 3 command signal.

The input signal to the amplifier 82 is formed by the algebraic summation of a zone air temperature signal $T_3$, a discharge duct air temperature signal $DS_3$, and a zone 3 set point temperature signal ($SP_3$). The zone air temperature signal $T_3$ is preferably provided by a sensing circuit including a thermistor, or equivalent element, which is disposed in the zone. The discharge duct air temperature signal is preferably provided by a circuit including a thermister or other equivalent sensing element situated in the discharge duct 34 adjacent the zone damper section 32. The zone set point temperature signal is preferably provided by a circuit including a manually adjustable potentiometer which is controlled, within limits, by an occupant of the zone. The zone and duct sensor circuits are schematically illustrated in FIG. 1.

The damper pair associated with zone 3 is actuated to positions at which the air flowing from the heating and cooling units 16, 18 is proportioned in accordance with the heating or cooling requirements of the zone as reflected by the zone 3 command signal. The command signal from the amplifier 82 is transmitted to the zone damper control 36 via a suitable conductor 84. The damper control 36 responds to command signal voltage levels within a predetermined range to position the damper pair in accordance with the command signal level. When the command signal is beyond the voltage range the damper pair is in one or the other of its limit positions.

The logic unit 80 enables the control system 20 to satisfy the heating requirements of the coolest zones and the cooling requirements of the warmest zone while the heating or cooling requirements of the remaining intermediate zone is satisfied by operation of its associated zone damper control unit alone. The command signal from the warmest zone has the most positive voltage level, the command signal from the coolest zone has the least positive voltage level, and the command signal from the zone of intermediate temperature has an intermediate voltage level. The logic unit 80 is connected to the outputs of each zone amplifier 82 and functions to transmit the command signal from the warmest zone to the cooling controller 72 via an output conductor 86 and to transmit the command signal from the coolest zone to the heating controller 70 via a conductor 88. The command signal from the remaining intermediate zone, or zones if more than three zones are present in the building, is blocked by the logic unit, but remains effective to govern the positioning of the zone damper pair for that zone.

The introduction of atmospheric air to the air conditioning system is variably controllable by the command signal from warmest zone. For this purpose a conductor 90 interconnects the ventilating damper control unit 60 and the logic unit output conductor 86.

Generally speaking, when the warmest zone is at or below a predetermined temperature less than its set point temperature, the command signal transmitted to the damper unit 60 is such that the intake air damper 54 is positioned for minimizing the introduction of atmospheric air to the system. This position of the intake air damper 54 is often referred to as "closed" but the damper 54 normally is in a limit position in which a predetermined minimum flow of atmospheric air is continuously introduced into the system to satisfy fresh-air ventilation requirements. A like flow of system air is exhausted from the system 10 through the exhaust damper 56, and as a result of leakage from the building. When the dampers 54, 56 are closed, the recirculating air damper 58 is wide open so that a maximum flow of system air is recirculated.

As the temperature of the warmest zone increases towards its set point temperature the command signal level increases and the damper control unit 60 is operated to progressively open the dampers 54, 56 while closing the damper 58. As the warmest zone continues to become warmer, the command signal level increases accordingly until a level is reached where the dampers 54, 56 are wide open and the damper 58 is closed. In this condition the operation of the damper control unit 60 is limited so that further increases in command signal level do not change the positions of the dampers 54, 56 and 58.

In such circumstances the atmospheric air is frequently solely used to control the load on the system, particularly when the temperature in the warmest zone stabilizes below a level which would require operation of the air cooling unit. When the warmest zone temperature increases sufficiently above the set point temperature that mechanical cooling of the air delivered to that zone is required, the zone command signal causes the cooling controller 72 to initiate operation of the cooling unit 18.

It is important to note that the unit 60 is constructed so that introduction of atmospheric air to the system is minimized when the command signal voltage is reduced below a predetermined level, as well as when the signal input to the unit 60 is interrupted. An example of such a damper control unit is illustrated and described in U.S. Pat. No. 3,782,122, issued Jan. 1, 1974 to which reference should be made for further details of construction of a suitable damper control unit.

An important feature of the invention resides in the provision of an atmospheric air sensing control unit 100 forming a part of the control system 20 and which is related to the control system so that the operation of the damper control unit 60 is governed in part by the unit 100 to minimize the introduction of atmospheric air into the system where the atmospheric air is too humid, or too warm, or both, to effectively aid in controlling the load on the system. The atmospheric air sensing unit 100 permits the operation of the damper unit 60 to be controlled by the command signal from the warmest zone only when the atmospheric air temperature and moisture conditions are within specified limits.

Figure 2:
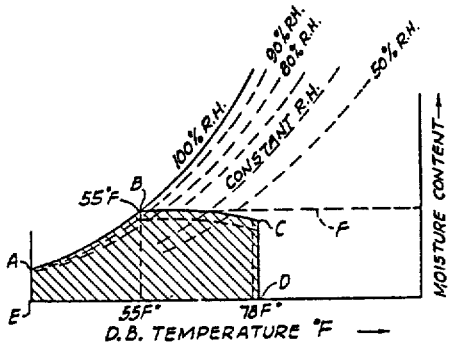
FIG. 2 is a representation of a psychrometric chart illustrating certain operating conditions of a system constructed according to the invention; and, FIG. 3 is a cross sectional view of a portion of the system of FIG. 1 with portions broken away.

The atmospheric air conditions under which the unit 60 is operable by the zone command signal from the warmest zone are illustrated in FIG. 2. Referring now to FIG. 2, a psychrometric diagram for air is schematically shown with a cross hatched area, bounded by the line segments A–B, B–C, C–D, D–E and E–A, representing those conditions of the atmospheric air in which the unit 100 permits the damper control unit 60 to be governed by the command signal from the warmest zone. In the psychrometric diagram the abscissa represents air temperature and the ordinate, at the right hand side of the diagram, represents moisture content of the air increasing proceeding away from the abscissa. The line segment A–B forms a segment of a curve representing constant 100% relative humidity, in that the air conditions along the curve are such that the air is saturated with moisture and condensation in the form of fog begins to occur if additional moisture is added to the air.

A family of constant relative humidity curves is indicated by dashed lines between the saturation curve and the abscissa, with each indicating a percentage of relative humidity, for example, 90%, 80%, etc.

As illustrated in FIG. 2, atmospheric air at any temperature over 78 F.°, regardless of its moisture content, is not introduced into the system 10 in quantities exceeding that required for ventilation purposes. Within a temperature range from 55 F.° to 78 F.° substantially all the air above a predetermined moisture level, indicated by the dashed line F, is prevented from entering the system since the moisture content of such air is sufficiently great that its introduction into the system in any substantial amounts would not efficiently cool the space being conditioned. Below 55 F.° all atmospheric air is admitted to the system since the temperature of that air is sufficiently low that, even though it may be saturated with moisture, the actual quantity of moisture is relatively low and does not adversely affect the ability of the air to cool the space.

The preferred atmospheric air sensing control unit 100 is effective to govern the introduction of atmospheric air into the system in cooperation with the zone signal producing circuit of the warmest zone and the damper control unit 60 by overriding the command signal from the warmest zone in response to detection of atmospheric air conditions which are not usable in the system 10. The control unit 100 includes a switch 101 (schematically shown in FIG. 1) which is opened to override the command signal by interrupting transmission of the command signal to the damper control unit 60 when the atmospheric air is not usable in the system.

Figure 3:
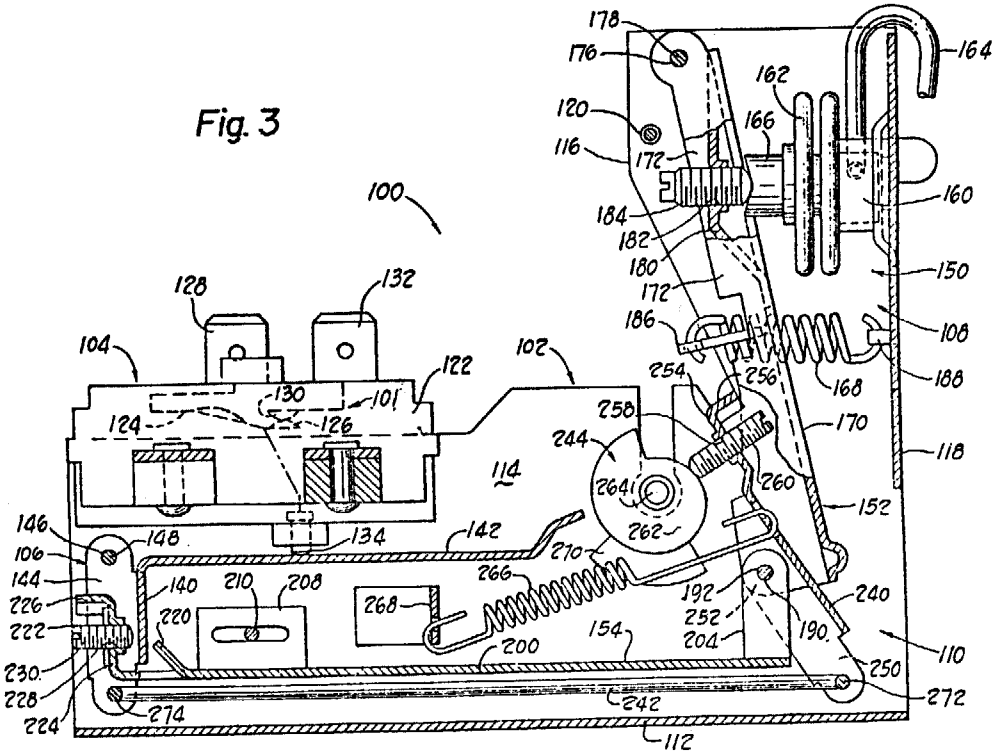

The atmospheric air sensing control unit 100 is illustrated in FIG. 3 of the drawings and comprises a support housing 102, a control switch unit 104, including the switch 101, attached to the housing, a switch operating member 106 supported in the housing for actuating the switch unit 104, a temperature responsive mechanism 108 and a humidity responsive mechanism 110.

The support housing 102 is formed from relatively heavy gauge sheet metal and comprises a generally rectangular base 112 having integral side walls 114 which are bent to extend parallel with each other at right angles from the plane of the base 112. The sidewalls 114 are substantially identical and each includes a projecting leg portion 116 extending from one end of the base 112.

The housing 112 is structurally strong and highly resistant to distortion. A supporting web 118 extends between the legs 116 to rigidly interconnect and space the legs apart at one end of the unit 100. A plurality of rigid spacers 120, only one of which is illustrated, also extend between the side walls 114 so that the side walls are rigidly interconnected at several locations about the unit 100.

The switch unit 104 may be of any suitable or conventional construction and is therefore only schematically illustrated. Preferably the unit 104 includes a rigid plastic housing 122 for the switch 101 which is staked and/or riveted to the housing 102 between the side walls 114 so that the switch unit is rigidly supported by the housing 102.

The switch 101 is preferably a single pole single throw snap acting switch having a conductive cantilevered snap spring arm 124 which carries a movable contact 126 at its end. The arm 124 and contact 126 are electrically connected to a terminal post 128. The contact 126 is snap moved into and out of engagement with a contact 130 which is electrically connected to a terminal post 132 to close and open the switch. The terminal posts, 128, 132 are connected to the conductor 90.

The spring arm 124 is constructed so that the contacts 126, 130 are normally open. That is to say, when the switch 101 is closed the spring arm 124 is self-biased toward a stable position in which the contacts are open. The spring arm 124 is mechanically linked to switch operating plunger member 134 which is slidably disposed in the switch housing 122 and projects into the support housing 102. The spring arm 124 continually biases the plunger 134 to project from the switch housing 122.

The plunger 134 is movable between a contacts open position in which it projects to its maximum extent from the switch housing 122 (and in which the contacts 126, 130 are open), to a depressed contacts closed position in which the plunger is moved sufficiently against the bias of the spring arm 124 that the contacts 126, 130 snap closed.

The switch actuating member 106 operates the plunger between its contacts open and contacts closed positions and is preferably pivotally supported in the housing 102 adjacent the switch unit and movable to control the plunger position. The actuating member is preferably formed by an L-shaped sheet metal lever body having legs 140, 142. A pair of spaced parallel ears 144, only one of which is shown, extend from the leg 140 in a direction away from the leg 142. The ears 144 define aligned holes 146 by which the member 106 is journaled on a pintle 148 extending through the holes 146 and anchored at its ends to the respective housing sidewalls 114.

The switch actuating member 106 pivots relative to the housing 102 about the axis of the pintle 148 to actuate the plunger 134 between its positions. As seen in FIG. 3 the leg 143 engages the plunger 134. When the member 106 rotates clockwise about the pintle 148 the plunger is moved towards its contacts open position by the spring arm 124. When the member 106 moves counterclockwise the leg 143 depresses the plunger against the spring arm tending to close the switch 101.

The temperature responsive mechanism 108 positions the member 106 for actuating the switch 101 in response to sensed atmospheric air temperature ambient the unit 100 beyond a predetermined range of temperatures, e.g. when atmospheric air temperatures are above 78 F.° or below 55 F.°. The temperature responsive mechanism comprises a thermostatic actuator arrangement 150 supported by the web 118, a lever assembly 152 which is pivotally movable in the housing 120 by the actuator 150, and an operating linkage 154 for interconnecting the lever assembly 152 and the switch actuating lever 106.

In the preferred embodiment of the invention the thermostatic actuator 150 is defined by a thermostatic expansible chamber type power element including a body 160 rigidly fixed to the web 118 and having an internal cavity which is closed by a bellows 162 to form the expansible chamber. A capillary tube 164, having a closed remote end (not shown), opens into the chamber through the body 160. The expansible chamber and capillary tube are filled with a suitable vapor characterized by having a substantial vapor pressure versus temperature relationship so that relatively slight changes in the temperature of the vapor result in relatively substantial extensions and retractions of the bellows 162 as the chamber pressure changes. The capillary tube 164 extends in the immediate vicinity of the unit 100 and has a relatively great thermal conductivity so that the fill vapor temperature closely follows changes in the atmospheric air temperature ambient, or surrounding, the unit 100. A projecting plug-like abutment 166 is attached at the closed end of the bellows 162 to transmit the bellows motion caused by chamber expansion to the lever assembly 152.

The actuator 150 also includes a tension spring 168 which is connected between the lever assembly 152 and the support web 118 for maintaining the lever assembly 152 in contact with the abutment element 166 and for returning the lever assembly 152 towards the power element as the bellows retracts in response to reductions in atmospheric air temperature.

The lever assembly 152 is pivoted by the actuator 150 relative to the housing 102 in response to sensed temperature changes. The lever assembly 152 includes a rigid sheet metal lever member including an elongated body 170 having side flanges 172 which are bent from opposite lateral sides of the body 170. The side flanges 172 are provided with aligned holes 176 by which the lever is journalled to a pintle 178 extending between the housing sidewall legs 116 adjacent their projecting ends. The lever assembly is pivotally movable about the pintle axis.

The lever body 170 also defines an outwardly struck integral strap-like portion 180 in which a tapped hole 182 is formed in alignment with the abutment member 166. A follower screw 184 is threaded through the hole 182 so that the end of the screw projecting through the hole bears on the abutment member 166.

The lever body 170 also defines an outwardly struck loop portion 186 extending in a plane generally transverse to the plane of the body 170 with the projecting portion of the loop being formed with a suitable hole for receiving an end of the tension spring 168. The formation of the loop 186 provides a substantial open area in the center of the body 170 through which the spring 168 extents. The opposite end of the spring 168 is connected to a sheet metal eye 188 formed in the web 118.

The operating linkage 154 is connected to the lever assembly 152 adjacent the end of the lever member remote from its pivot axis and extends toward the leg 140 of the chamber 106. The lever side flanges 172 are provided with aligned holes 190 adjacent the end of the lever assembly 152 and a pintle 192 is fixed in the holes 190 to provide a pivotal interconnection between the lever assembly 152 and the operating linkage 154.

The operating linkage 154 comprises an elongated body 200 which is connected to the lever assembly 152 by parallel arms 204 which are bent to extend from opposite lateral sides of the body 200 to the pintle 192. The arms 204 extend between the lever side flanges 172 and are provided with aligned holes 206 by which the body 200 is journaled to the pintle 192.

As the lever assembly 152 is pivoted by the actuator 150 the operating linkage 154 is shifted back and forth within the housing 102 generally parallel to the plane of the housing base 112. The body 200 is guided towards and away from the switch actuating member 106 by a pin and a slot arrangement defined by a pair of slotted tabs 208 which project from opposite lateral sides of the body 200, and a fixed cylindrical pin 210 which is connected at its ends to the housing sidewalls 114 and extends through the slots. The relationship between the pin 210 and the tab slots is such that the body 200 is shiftable back and forth within the housing 102 with the slight relative rotation between the pin 210 and the tabs 208 being ineffective to impede reciprocating motion of the body.

The operating linkage carries spaced abutments 220, 222 for respectively engaging and moving the actuator member 106 to positions at which the switch contacts 126, 130 are respectively open or closed. The engagement between the abutment 220 and the member 106 results in opening the switch 101 at the high temperature end of the range (e.g. 78 F.°). As shown in FIG. 3 the abutment 220 is defined by a tongue which projects from the linkage body 200 into alignment with the leg 140. As sensed temperature increases the linkage body 200 is shifted by clockwise motion of the lever assembly 152 (as seen in FIG. 3) until the tongue engages the leg 140 and pivots the member 106 clockwise about its pintle 148. When the atmospheric temperature is at a predetermined relatively high level, the tongue has shifted the member 106 sufficiently that the switch contacts 126, 130 are permitted to snap open.

Engagement between the abutment 222 and the member 106 as atmospheric air temperatures decrease results in the switch 101 being closed when a predetermined low temperature is sensed. The abutment 222 is formed by an end flange 224 formed on the body 200 on the opposite side of the leg 140 from the tongue 220. The end flange 224 terminates in a stiffening lip 226 and is provided with a tapped hole 228 which is aligned with the leg 140. An abutment screw 230 is threaded into the hole 228 for engagement with the leg 140.

When atmospheric air temperatures ambient the unit 100 are reduced, the spring 168 moves the lever assembly 152 counterclockwise, as viewed in FIG. 3, to follow the retraction of the bellows and the screw 230 moves to engage the leg 140. When the ambient atmospheric temperature is reduced to a predetermined level the member 106 has been rotated counterclockwise about the pintle 148 to a position at which the spring plunger 134 is depressed to its contacts closed position. The member 106 is positively maintained in the position for holding the switch contacts closed upon further reductions in atmospheric temperature.

The respective high and low limits of the temperature range are adjustably controllable by advancing or retracting the screws 184, 230, respectively. As previously noted, the low temperature limit is preferably set at about 55 F.°; however if a higher low limit temperature is desired the screw 230 is merely advanced into the tapped hole 228. Retracting the screw 230 results in a reduction in the low limit temperature. The high limit temperature of the range is preferably set at around 78 F.°; however this limit temperature can be raised by retracting the screw 180 or reduced by advancing the screw 180. The screws 184, 230 are both adjacent open sides of the housing 102 and are thus readily accessible for factory calibration or field adjustment, if the latter is required.

The construction of the temperature responsive mechanism is such that the switch contacts 126, 130 are positively maintained closed when atmospheric air is below the low limit temperature notwithstanding the sensed moisture content of the air, while the contacts 126, 130 are open and cannot be closed when sensed atmospheric air temperature is above the high limit of the temperature range irrespective of sensed atmospheric air moisture content.

The humidity responsive mechanism comprises a lever 240 journalled on the pintle 192 of the lever assembly 152, a humidity responsive element 242 which extends between the lever 240 and the switch operating member 106 and a moisture level response adjustment assembly 244 which provides an adjustable fulcrum location about which the lever 240 is normally moved.

The lever 240 is defined by an elongated sheet metal body having integral bent side flanges 250 extending generally parallel to each other from the plane of the body. The side flanges define aligned holes 252 by which the lever 240 is journaled on the pintle 192 so that the lever 240 and the lever assembly 152 are relatively rotatable about the axis of the pintle 192. The lever body and side flanges 250 are nested within the side flanges 172 of the lever assembly 152. The operating linkage arms 204 preferably extend between the side flanges 250. The lever 240 includes a body end portion 254 extending towards the adjustment assembly 244 which terminates in a stiffening lip 256 and defines a tapped hole 258 in which a follower screw 260 is threaded.

The moisture level response adjusting assembly 244 is manually operable to enable the unit 100 to respond to selected desired atmospheric air moisture levels within the operating temperature range of the humidity responsive mechanism. The adjusting assembly comprises a cam member 262 against which the follower screw 260 bears and which is fixed on a control shaft 264 for rotation with the shaft. The contact location between the screw 260 and the cam 262 provides the fulcrum for the lever 240. The shaft 264 is journaled in the housing 102 and projects through the housing sidewall 114. An end of the shaft 264 (not shown) projects from the housing 102 and is constructed to receive a knob (not shown) by which the cam 262 is manually rotated. The cam 262 defines a generally spiral cam track upon which the follower screw 260 rides so that rotation of the cam 262 shifts the fulcrum location about which the lever 240 rotates.

The follower 260 is maintained in engagement with the cam 262 by a tension spring 266 which is connected between the lever 240 and a fixed spring supporting tongue 268 projecting inwardly from the housing sidewall 214.

The humidity responsive element 242 is connected to the end of the lever 240 remote from its fulcrum and extends to the operating member 106 generally parallel to the housing base 112. The humidity responsive element can be of any suitable construction or composition, such as a thin nylon strip or a plurality of human hairs, but is preferably formed by a thin nylon endless belt. The belt is reaved around a smooth cylindrical pin 272 fixed between the lever side flanges 250 and about a smooth cylindrical pin 274 fixed between portions of the operating member ears 144 which project towards the housing base 112 from the leg 140.

The belt 242 elongates when the relative humidity of the ambient atmospheric air increases and contracts when the ambient relative humidity is reduced.

Referring again to FIG. 2 it is apparent that relative humidity varies as a function of both temperature and moisture content. This is to say, relative humidity changes when the moisture content of constant temperature air changes as well as when the temperature of air having an unvarying moisture content changes. Since the element 242 expands and contracts in response to changes in relative humidity, an increment of its expansion or contraction is attributable to air temperature change whenever the relative humidity change is accompanied by a change in air temperature. Likewise some increment of the element's expansion or contraction is attributable to changing air moisture level when a change in relative humidity is accompanied by a change in air moisture content.

The coaction between the temperature responsive mechanism 108 and the humidity responsive mechanism 110 substantially eliminates movement of the operating member 106 by incremental expansion or contraction of the element 242 due to temperature related relative humidity changes. The temperature responsive mechanism changes the effective length of the element 242 in response to sensed atmospheric air temperature changes to compensate for incremental changes in length of the element caused by temperature changes. Accordingly the effective length of the element remains substantially constant unless the moisture content of the air changes.

When the moisture content of the atmospheric air increases, the element 242 permits the operating member 106 to be pivoted clockwise under the biasing force of the switch spring arm 124 transmitted to the member 106 via the plunger 134. Hence the switch arm 124 tends to move toward its open position. Reduction in the air moisture content shortens the belt 242 to rotate the member 106 counterclockwise which in turn tends to close the switch 101.

The incremental change in length of the element 242 due to a given temperature change is not linear over the entire temperature range in which the element is effective. As illustrated by FIG. 2, the line segment B-C, which indicates the air moisture content at which the switch 101 is opened on rising moisture levels, is substantially parallel to the constant moisture level line F. However the segment B-C does drop off slightly at the high temperature end of the range. For all practical purposes the switch 101 is opened at a constant air moisture level throughout the temperature range.

As noted previously, the moisture level at which the switch 101 is actuated is adjustable by rotating the cam 262 to shift the fulcrum location of the lever 240. When the cam 262 is rotated clockwise, as viewed in FIG. 3, the air moisture level at which the switch is actuated is reduced. Rotation of the cam in the opposite direction increases the air moisture level at which the switch is actuated. The follower screw 260 is advanced or retracted from the lever 240 to initially calibrate the operation of the unit 100. After calibration, the moisture level at which the switch 101 operates is adjusted solely by movement of the cam 262. The screw 260 is accessible for calibration via aligned openings in the web 118, and the lever assembly 152.

The switch 101 requires a slightly greater level of force to effect closure of the contacts than the force which is exerted against the spring arm 124 when the contacts snap open. Accordingly the switch 101 provides a slight but discernable differential between the conditions at which the switch is opened and closed. Hence, in the illustrated system, the switch 101 is opened at 78 F.° in response to rising air temperatures and recloses at a temperature slightly less than 78 F.°. The switch 101 opens at a predetermined air moisture level in response to increasing moisture content and recloses at a slightly lower air moisture level. The differential is illustrated by dashed lines adjacent the line segments B-C and C-D of FIG. 2.

As noted previously the switch arm 124 provides a biasing force which continually urges the member 106 clockwise about the pintle 148, as viewed in FIG. 3. When the element 242 is taut, the force of the tension spring 266 acting on the element 242 via the lever 240 opposes the action of the spring arm 124 and the effective spring force of the spring 266 is substantially greater than that of the spring arm 124. Thus the spring arm 124 does not adversely affect operation of the humidity responsive mechanism 110.

When atmospheric air temperatures are low and continue to decrease, the counterclockwise movement of the lever assembly 152 maintains the switch 101 closed but may also tend to unduly tension the element 242 particularly when the atmospheric air contains very little moisture. To avoid this possibility the spring 266 is relatively light as compared to the spring 168 so that when the atmospheric air temperatures and moisture levels are low and decreasing, the tension in the element 242 reaches a magnitude which is sufficient to rotate the lever 240 relative to the lever assembly 152 about the pintle 192 and elongate the spring 266.

The level of element tension required to deflect the spring 266 is relatively low so that the element is not stressed beyond its elastic limit. Deflection of the spring 266 lifts the follower screw 260 from the cam 262 but does not impair operation of the humidity sensing mechanism since the spring 266 returns the lever 240 to its operative position long before the return of atmospheric air conditions to levels which are desirable to control.

In the event a user of the system 10 should desire to condition the control system 20 so that the damper control unit 60 responds solely to the command signal from the warmest zone, the cam 262 is rotated clockwise to a limit position in which a lobe 270 on the cam engages the projecting end of the operating member leg 142 and rotates the member 106 to positively close the switch 101. When the cam 262 is so positioned the switch 101 cannot be opened under any reasonably expectable atmospheric air conditions. If atmospheric air temperatures increase to levels sufficient to cause the abutment 220 to engage the member 106 and urge the member 106 clockwise toward its switch opening position, the switch remains closed because the member 106 remains unmovable by the action of the cam lobe 270 on the leg 142 of the member 106. The vapor pressure within the bellows 162 increases when ambient temperature increases, but bellows movement does not occur beyond the stopped position. The resulting increased loading stresses in the lever system are minimal.

While only a single embodiment of the invention is illustrated and described in detail, the invention is not to be considered limited to the precise construction shown. For example, although a multiple zone air conditioning system is disclosed, the invention is equally applicable to appropriately constructed single zone systems. Various adaptations, modifications and uses of the invention may occur to those skilled in the art and the intention is to cover all such adaptations, modifications and uses which come within the scope and spirit of the claims.

What is claimed is:

1. A control device responsive to ambient air temperature and moisture content levels comprising:

a. a control unit operable between first and second control conditions;

b. an operating member for said control unit, said operating member supported for movement between first and second positions in which said control unit is in said first and second conditions, respectively;

c. relative humidity responsive means for moving said operating member and comprising an elongated humidity sensing element comprised of a material which changes length in response to changes in relative humidity of air ambient said element and supporting structure for said element;

d. air temperature responsive means cooperating with said relative humidity responsive means to prevent actuation of said operating member in response to changes in ambient air relative humidity occurring as a result of air temperature changes within a given range, said operating member being moved substantially only in response to sensed changes in moisture content of the air in said temperature range; and e. said temperature responsive means comprising a link member movable to a first position in response to sensed air temperatuers above said range to prevent actuation of said operating member to its first position by said humidity responsive means, said link member movable to a second position in response to sensed air temperatures below said range to prevent actuation of said operating member to its second position by said humidity responsive means.

2. A control as claimed in claim 1 wherein said link member defines first and second spaced abutments, said first abutment engaging said operating member and maintaining said operating member in its first position when atmospheric air temperature is reduced to the lowest temperature of said temperature range, said second abutment engageable with said operating member for maintaining said operating member in its second position when atmospheric air temperature is increased to the highest temperature of said range.

3. A control as claimed in claim 2 wherein said supporting structure for said element comprises a part for connecting said element to said operating member, said element effective to change length and move said operating member between its first and second positions when said abutments are spaced from said operating member in its first and second positions, respectively.

4. The device claimed in claim 3 wherein said element support structure further comprises a part for connecting said element to said temperature responsive means, said temperature responsive means effective to move said element in response to sensed atmospheric air temperature changes within said range, incremental changes in length of said element due to temperature effects on sensed relative humidity are substantially ineffective to move said operating member.

5. A control mechanism responsive to changes in air temperature and moisture conditions comprising:

a. a control member actuable between first and second positions;

b. a moisture sensing mechanism comprising:

i. a humidity sensing element which changes dimension as the relative humidity of air ambient the element changes;

ii. temperature responsive means cooperating with said humidity sensing element to move said element in response to sensed temperature changes within a first range so that said element effectively changes dimension substantially only in response to changes in ambient air moisture content;

iii. structure interconnecting said element and said control member for effecting movement of said control member as said element effectively changes dimension;

iv. said humidity sensing element and said temperature responsive means cooperating to operate said control member to one of said positions in response to detection of ambient air within said temperature range having less than a first predetermined moisture content and to operate said control member to said other position in response to detection of ambient air within said temperature range having greater than said predetermined moisture content; and, c. linkage means interconnecting said temperature responsive means and said control member for operating said control member to one of said positions when ambient air temperatures increase beyond said temperature range irrespective of the air moisture content, and operating said control member to said other position when ambient air temperatures decrease below said temperature range irrespective of the air moisture content.

6. The mechanism claim in claim 5 wherein said temperature responsive means further comprises thermostatic actuator means and lever means engaged by said actuator means; said lever means comprising a lever member having first and second end portions, pivot structure supporting said lever member for rotation about said first end portion, a part engageable with said thermostatic actuator means between said end portions and structure for connecting said second lever end portion to said linkage means.

7. The mechanism claimed in claim 6 wherein said linkage means comprises an elongated body member extending from said lever means, and first and second spaced abutments defined on said body member, said body member movable in the directions of its extent in response to movement of said lever means, said first abutment effective to cause operation of said control member to said first position when said body member moves in one direction and said second abutment effective to cause operation of said control member to said second position when said body member moves in the opposite direction.

8. The mechanism claimed in claim 7 further including a pivotally supported operating member having a first position extending into engagement with said control member and a second portion extending between said first and second abutments, said operating member pivotally movable with respect to said operating member to move said operating member between said positions.

9. The mechanism claimed in claim 8 further including first element support means for connecting said humidity sensing element to said second end of said lever member and second element support means for connecting said humidity responsive element to said second portion of said operating member.

*10. A control unit comprising:*

*(a) a support housing;*

*(b) a control switch unit support by said support housing and operable between first and second conditions;*

*(c) a switch operating member supported by said housing for movement relative to said switch unit, said operating member effective to move and change the condition of said switch unit;*

*(d) a humidity responsive mechanism effective to move said switch operating member in response to sensed changes in humidity;*

*(e) a temperature responsive mechanism for effecting movement of said operating member in response to sensed changes in temperature;*

*(f) said humidity responsive mechanism comprising a humidity sensitive element whose length tends to change in response to changes in humidity, said element disposed between said temperature responsive mechanism and said switch operating lever to exert actuating force on said operating member which varies as a function of sensed temperature and humidity; and,*

*(g) said temperature responsive mechanism comprising an actuator member for transmitting force to said switch operating member from said temperature responsive mechanism to maintain said control switch unit in one of said conditions when sensed humidity levels are such that said humidity sensitive element is ineffective to maintain said switch unit in said one condition.*

*11. The control unit claimed in claim 10 wherein said humidity sensitive element comprises an elongated element for transmitting tensile forces between said operating member and said temperature responsive mechanism, said element tending to elongate in response to sensed increases in humidity, said actuator member extending generally parallel to said element and having a lost motion connection with said operating member.*

*12. The control claimed in claim 10 further including manually operable means for positioning said operating member to maintain said control switch unit in said one condition regardless of sensed humidity and temperature.*

*13. The control unit claimed in claim 10 wherein said actuator member is supported for lost motion with respect to one of said temperature responsive mechanism or switch operating member so that said humidity sensitive element is effective to move said switch operating member while said actuator member undergoes lost motion.*

*14. A control unit sensitive to changes in sensed air temperature and humidity comprising:*

*(a) a control switch unit operable between first and second conditions;*

*(b) an operating member movable relative to said switch unit to operate said switch unit between said conditions; and,*

*(c) an actuator system for positioning said operating member in relation to sensed temperature and humidity comprising:*

*(i) a first lever pivotally movable relative to said operating member;*

*(ii) a thermally responsive power element for moving said first lever;*

*(iii) a second lever pivoted to said first lever;*

*(iv) an elongated humidity responsive element extending between said second lever and said operating member, the length of said element changing in response to changes in humidity so that said operating member can be repositioned in response to sensed changes in humidity and temperature; and,*

*(v) a link member connected for lost motion engagement between said actuator system and said operating member;*

*said operating member being positionable by said link member irrespective of said humidity responsive element under predetermined sensed conditions.*

*15. A control comprising:*

*(a) a support housing;*

*(b) a control switch unit supported by said housing, said control switch unit operable between first and second conditions;*

*(c) an operating member supported by said housing and movable to alter the condition of said control switch unit;*

*(d) humidity responsive actuator means for moving said operating member in response to sensed changes in humidity, said humidity responsive actuator means comprising a lever supported for pivotal movement relative to said housing and an elongated humidity responsive element extending between said lever and said operating member;*

*(e) temperature responsive actuator means for moving said operating member in response to sensed temperature changes, said temperature responsive actuator means comprising:*

*(i) a second lever pivotally supported by said housing;*

*(ii) a thermally responsive power element for pivoting said second lever relative to said housing in response to temperature changes;*

*(iii) structure for pivoting said first lever to said second lever so that said element is effective to transmit force from said temperature responsive actuator to said operating member; and,*

*(iv) a link member connected for lost motion between said operating member and a location in the vicinity of the pivot structure between said first and second levers, said link member effective to move said operating member to maintain said switch unit in one condition when temperature falls below a predetermined level substantially independently from sensed humidity.*

* * * * *